(12) United States Patent
Wu et al.

(10) Patent No.: US 9,838,915 B2
(45) Date of Patent: Dec. 5, 2017

(54) METHOD AND APPARATUS FOR DISPLAYING NETWORK NAME

(71) Applicant: Huawei Technologies Co., Ltd., Shenzhen (CN)

(72) Inventors: Xiaobo Wu, Shanghai (CN); Lin Shu, Shanghai (CN); Wanqiang Zhang, Beijing (CN); Hai Liu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 201 days.

(21) Appl. No.: 14/623,234

(22) Filed: Feb. 16, 2015

(65) Prior Publication Data

US 2015/0163702 A1  Jun. 11, 2015

Related U.S. Application Data

(63) Continuation of application No. PCT/CN2012/080336, filed on Aug. 20, 2012.

(51) Int. Cl.
*H04W 36/00* (2009.01)
*H04W 60/00* (2009.01)
(Continued)

(52) U.S. Cl.
CPC ....... *H04W 36/0022* (2013.01); *H04W 48/08* (2013.01); *H04W 48/18* (2013.01);
(Continued)

(58) Field of Classification Search
CPC . H04W 36/0022; H04W 48/08; H04W 48/18; H04M 2215/81
See application file for complete search history.

(56) References Cited

U.S. PATENT DOCUMENTS 8,116,744 B1   2/2012 Mikan et al.
2009/0270099 A1* 10/2009 Gallagher ............... H04W 8/08
                                                     455/435.1
(Continued)

FOREIGN PATENT DOCUMENTS

CN        1756390 A     4/2006
CN        1756423 A     4/2006
(Continued)

OTHER PUBLICATIONS

"3rd Generation Partnership Project; Technical Specification Group Services and System Aspects; Intra-domain Connection of Radio Access Network (RAN) Nodes to Multiple Core Network (CN) Nodes (Release 10)," 3GPP TS 23.236 V10.3.0, Mar. 2012, 39 pages.

(Continued)

*Primary Examiner* — Omer S Mian
(74) *Attorney, Agent, or Firm* — Slater & Matsil, LLP

(57) ABSTRACT

A user equipment UE attaches to a first network, and displays a first network name, where the first network name is a network name of the first network; or the UE executes a combined attach procedure or a combined tracking area update procedure to attach to the first network or a second network, and displays the first network name, where the first network name is a network name of the first network or a network name of the second network; and in a process of executing a service in the first network, the UE changes from the first network to the second network or a third network, and the UE keeps displaying the first network name. It is ensured that a network name displayed on a terminal is consistent with a network name that is displayed on a UE and recorded by a network device.

15 Claims, 8 Drawing Sheets

(51) Int. Cl.
*H04W 48/18* (2009.01)
*H04W 48/08* (2009.01)
*H04W 36/14* (2009.01)

(52) U.S. Cl.
CPC ........ *H04W 60/00* (2013.01); *H04M 2215/81* (2013.01); *H04W 36/14* (2013.01)

(56) References Cited

U.S. PATENT DOCUMENTS

| | | | |
|---|---|---|---|
| 2009/0318148 A1* | 12/2009 | Zinn | H04W 8/183 455/435.2 |
| 2010/0216439 A1 | 8/2010 | Marcelli et al. | |
| 2011/0021216 A1 | 1/2011 | Pudney et al. | |
| 2011/0032902 A1* | 2/2011 | Kim | H04W 48/08 370/331 |
| 2011/0188451 A1 | 8/2011 | Song et al. | |
| 2012/0100892 A1 | 4/2012 | Arzelier et al. | |
| 2012/0189016 A1* | 7/2012 | Bakker | H04W 76/021 370/401 |
| 2013/0203472 A1 | 8/2013 | Arzelier et al. | |
| 2014/0301366 A1 | 10/2014 | Guo | |
| 2016/0183156 A1* | 6/2016 | Chin | H04W 36/0022 370/331 |

FOREIGN PATENT DOCUMENTS

| | | |
|---|---|---|
| CN | 1870825 A | 11/2006 |
| CN | 1889789 A | 1/2007 |
| CN | 101610504 A | 12/2009 |
| CN | 101677481 A | 3/2010 |
| CN | 101730078 A | 6/2010 |
| CN | 101997951 A | 3/2011 |
| CN | 102448043 A | 5/2012 |
| EP | 1513358 A1 | 3/2005 |
| EP | 2048891 A1 | 4/2009 |
| EP | 2285162 A2 | 2/2011 |
| JP | 2009296098 A | 12/2009 |
| JP | 2013544043 A | 12/2013 |
| WO | 2012052507 A1 | 4/2012 |

OTHER PUBLICATIONS

"3rd Generation Partnership Project; Technical Specification Group Services and System Aspects; Network Sharing; Architecture and Functional Description (Release 11)," 3GPP TS 23.251 V11.2.0, Jun. 2012, 29 pages.

"3rd Generation Partnership Project; Technical Specification Group Services and System Aspects; General Packet Radio Service (GPRS) Enhancements for Evolved Universal Terrestrial Radio Access Network (E-UTRAN) Access (Release 11)," 3GPP TS 23.401 V11.2.0, 285 pages.

3rd Generation Partnership Project; Technical Specification Group Services and System Aspects; General Packet Radio Service (GPRS); Service description; Stage 2 (Release11); 3GPP TS 23.060 V11.2.0 (Jun. 2012), 335 pages.

3rd Generation Partnership Project; Technical Specification Group Services and System Aspects; Circuit Switched (CS) fallback in Evolved Packet System (EPS); Stage 2 (Release 11), 3GPP TS 23.272 V11.1.0 (Jun. 2012), 90 pages.

Alcatel-Lucent, "Full-MOCN-GERAN: detailed technical discussion," 3GPP TSG GERAN WG2 Meeting #52, Tdoc GP-111723; Bratislava, Slovakia, Nov. 22-24, 2011, 8 pages.

Huawei et al., "Asynchronous display of network name in CSFB deployment," 3GPP TSG CT WG1 Meeting #73; C1-113214; St. Julians, Malta, Aug. 22-26, 2011, 4 pages.

Huawei, et al., "Network Name Display in CSFB Deployment," 3GPP TSG CT WG1 Meeting #74, C1-113943, Hyderabad (India), Oct. 10-14, 2011, 4 pages.

Huawei, et al., "Asynchronous display of network name in CSFB deployment," Change Request—29.118 CR 0180, Rev. 3; Current version: 11.0.0; 3GPP TSG CT WG1 Meeting #74 C1-114477, Hyderabad (India), Oct. 10-14, 2011; 4 pages.

* cited by examiner

| A network device sends a public land mobile network identity PLMN ID of a Long Term Evolution network and a PLMN ID of a circuit switched domain network to a user equipment UE by using a combined attach procedure or a combined tracking area update procedure, where the network device is a network device in the Long Term Evolution network, and the Long Term Evolution network and the circuit switched domain network are two networks with which the UE is registered in a combined manner by using the combined attach procedure or the combined tracking area update procedure | ← 210 |

↓

| The network device determines whether a home PLMN ID of the UE is the same as the PLMN ID of the Long Term Evolution network and the PLMN ID of the circuit switched domain network | ← 211 |

↓

| If the home PLMN ID is different from both the PLMN ID of the Long Term Evolution network and the PLMN ID of the circuit switched domain network, acquire a configuration prestored in the network device, where the configuration is information of a first network name, the information of the first network name is a PLMN ID corresponding to the first network name that is displayed on the UE, and/or the first network name displayed on the UE; and the first network name displayed on the UE is the first network name corresponding to a predetermined PLMN ID, and the predetermined PLMN ID is one of: the PLMN ID of the Long Term Evolution network and the PLMN ID of the circuit switched domain network | ← 220 |

↓

| If the network device determines that information of a second network name to be displayed on the UE needs to be sent to the UE, the network device sends the information of the second network name to the UE, so that the UE displays the second network name corresponding to the information of the network name | ← 230 |

FIG. 2a

METHOD AND APPARATUS FOR DISPLAYING NETWORK NAME

This application is a continuation of International Application No. PCT/CN2012/080336, filed on Aug. 20, 2012, which is hereby incorporated by reference in its entirety.

TECHNICAL FIELD

The present invention relates to the field of wireless communications, and in particular, to a method and apparatus for displaying a network name.

BACKGROUND

The 3rd Generation Partnership Project (3GPP) launches an evolved packet system (EPS) on the basis of the existing 2nd generation (2G) mobile communications, and 3rd generation (3G) mobile communications. An EPS network includes an evolved universal mobile telecommunication system territorial radio access network (E-UTRAN) and an evolved packet core network (EPC). In an early stage of network construction of an EPS network, an operator already has a mature circuit switched (CS) network. However, the EPS network processes only a packet switched (PS) service. For protection of a CS network investment and a deployment policy of the EPS network, the operator may use an original CS network device to provide a CS service. Based on this requirement, the 3GPP extends a function of a Gs interface between a mobile switching center/visitor location register (MSC/VLR) and a serving GPRS support node (SGSN) in an existing 2G or 3G network, and defines an SGs interface between an MSC/VLR and a mobility management entity (MME) in an EPC network. Based on a function of the SGs interface, the 3GPP proposes a "circuit switched fallback" (CSFB) technology and a short message over SGs (SMS over SGs) technology. The CSFB technology enables a user equipment (UE) covered by an E-UTRAN, when a CS voice service needs to be processed, to fall back to a CS domain in a 2G/3G network through the E-UTRAN, so as to complete processing of the CS voice service. The SMS over SGs technology enables a UE residing in the E-UTRAN to reuse an existing CS domain device to implement transmission of a short message in the CS domain.

To greatly reduce a heavy cost for radio access network deployment by the operator, the 3GPP proposes a network sharing idea, that is, public land mobile networks (PLMN) of multiple operators, or multiple PLMNs of one operator may share a same radio access network to provide a wireless communications service. For the CSFB technology and the SMS over SGs technology, the operator also proposes a requirement for CS domain network sharing, and there are mainly the following two scenarios:

Scenario 1: A traditional operator upgrades an existing CS domain network (including a 2G network and a 3G network), so as to support the CSFB technology and the SMS over SGs technology, that is, the operator may provide, by sharing multiple PLMNs run by the operator or by sharing a PLMN of another operator by signing a roaming protocol, a CS service for a UE residing in an E-UTRAN.

Scenario 2: An emerging pure-PS service operator leases a CS domain network from a traditional operator by signing an agreement, so as to support the CSFB technology and the SMS over SGs technology.

In the foregoing CS domain network sharing scenario, for a same UE residing in the E-UTRAN, multiple available PLMNs may provide a CS service for the UE. In a combined attach procedure or a combined tracking area update procedure initiated by a UE, if multiple available PLMNs provide a CS service for the UE, an MME selects a proper PLMN according to a PLMN reported by an evolved base station (e.g, evolved node B, eNB), location information of a tracking area in which the UE is currently located, and a CS domain network selection policy of the operator. Based on the selected PLMN and the location information of the tracking area in which the UE is currently located, a corresponding CS domain location area identity (LAI) is assigned to the UE, and an associated MSC/VLR is selected based on the LAI. After the combined attach procedure is completed, the UE receives an attach accept message sent by the MME, where the attach accept carries a tracking area identity list (TAI list), the LAI, and a VLR temporary mobile subscriber identity (TMSI). For the UE, that the UE acquires the LAI and the VLR TMSI indicates that attach to the CS domain succeeds.

After the combined attach procedure is completed, the UE succeeds in registering with a network of the operator, and the UE should display a registered network name. Alternatively, after the combined tracking area update procedure, the UE should display the registered network name. Currently, the UE displays the network name mainly based on two policies.

Policy 1: Configuration is not performed on a network side, and the UE displays a network name according to a configuration of the UE.

Specifically, the UE displays, according to a PLMN identifier (ID) of a currently registered network, a network name corresponding to the PLMN ID.

However, in some scenarios, the UE cannot determine that a network name corresponding to which PLMN ID is to be displayed.

Policy 2: A network side delivers a to-be-displayed network name to the UE.

When receiving the network name delivered by the network side, the UE may use the received network name to update a network name configured on the UE, and display an updated network name.

(1) The MME notifies the UE of the to-be-displayed network name by using an E-UTRAN mobility management information (EMM information) message, and the UE displays the notified network name. The network name notified by the MME is determined by the MME according to a home PLMN (HPLMN) of the MME.

(2) The MSC/VLR delivers a network name of a registered CS domain network to the MME over an SGs interface. The MME notifies the to-be-displayed network name to the UE by using an EMM Information message, and the UE displays the notified network name. The network name notified by the MME is a network name of an HPLMN of the MME, where the network name of the HPLMN of the MME is determined by the MME according to a policy of the MME; or is a network name of a CS domain network registered through the MSC/VLR.

However, in a policy in which the network side delivers a network name to the UE for display, in some scenarios, the UE cannot determine a to-be-displayed network name, and the MME cannot know which network name the UE displays in fact either.

SUMMARY

In view of this, embodiments of the present invention provide a method and apparatus for displaying a network name, so as to solve the problem of poor user experience caused when a network name displayed on a UE changes in the prior art.

According to a first aspect, a method for displaying a network name is provided, including:

attaching, by a user equipment UE, to a first network, and displaying a first network name, where the first network name is a network name of the first network; or executing, by the UE, a combined attach procedure or a combined tracking area update procedure to attach to the first network or a second network, and displaying the first network name, where the first network name is a network name of the first network or a network name of the second network; and in a process in which the UE executes a service in the first network, changing, by the UE, from the first network to the second network or a third network, and keeping displaying, by the UE, the first network name.

In a first possible implementation manner of the first aspect, the first network is a Long Term Evolution network, the second network and the third network are circuit switched domain networks, and the service is a circuit switched fallback CSFB service; and the changing from the first network to the second network or a third network includes: falling back, by the UE, from the first network to the second network or the third network in a process in which the UE executes the CSFB service in the first network.

In a second possible implementation manner of the first aspect, the service is a voice service, and the changing from the first network to the second network or a third network includes: performing a handover to the second network or the third network in a process in which the UE executes the voice service in the first network.

With reference to the second possible implementation manner of the first aspect, in a third possible implementation manner, the first network is a Long Term Evolution network, the second network or the third network is a circuit switched domain network; and the performing the handover to the second network or the third network in a process in which the UE executes the voice service in the first network includes: starting, by the UE, the voice service in the Long Term Evolution network, executing single radio voice call continuity or executing a packet-switched handover, and handing over the UE to the second network or the third network to execute the voice service; or the first network is a first 2G network or a first 3G network, and the second network or the third network is a second 3G network, or the second network or the third network is a second 2G network, or the second network or the third network is a 4G network; and the performing the handover, on the voice service, to the second network or the third network in a process in which the UE executes the voice service in the first network includes: starting, by the UE, the voice service in the first 2G network or the first 3G network, executing reverse single radio voice call continuity, and handing over the UE to the second 3G network or the second 2G network or the 4G network to execute the voice service; or the first network is a first 2G network or a first 3G network, and the second network or the third network is a second 3G network, or the second network or the third network is a second 2G network; and the performing the handover, on the voice service, to the second network or the third network in a process in which the UE executes the voice service in the first network includes: starting, by the UE, the voice service in the first 2G network or the first 3G network, executing a circuit-switched handover, and handing over the UE to the second 3G network or the second 2G network to execute the voice service.

With reference to the first aspect or any possible implementation manner of the first aspect, in a fourth possible implementation manner, the keeping displaying, by the UE, the first network name includes:

receiving, by the UE, information of a second network name of the second network or the third network, and ignoring, by the UE, the received information of the second network name or keeping displaying, by the UE, the first network name, where the second network name is a network name of the second network or the third network that is changed to.

With reference to the first aspect or any possible implementation manner of the first aspect, in a fifth possible implementation manner, the method further includes:

if the service is executed completely, changing, by the UE, display of the first network name to display of the second network name, where the second network name is the network name of the second network or the third network that is changed to.

According to a second aspect, a user equipment UE is provided, where the UE includes an instructing module, configured to:

execute an attach procedure to attach to a first network, or execute a combined attach procedure to attach to the first network and a second network, and instruct a displaying module to display a first network name; and in a process of executing a service in the first network, change from the first network to the second network or a third network, and instruct the displaying module to display the first network name; and the displaying module, configured to display the first network name indicated by the instructing module.

In a first possible implementation manner of the second aspect, the instructing module is specifically configured to: in the process of executing the service in the first network, change from the first network to the second network or the third network in the following manner: in a process of executing a circuit switched fallback CSFB service in the first network, falling back from the first network to the second network or the third network, and instructing the displaying module to display the first network name, where the first network is a Long Term Evolution network, the second network and the third network are circuit switched domain networks, and the service is the CSFB service.

In a second possible implementation manner of the second aspect, the instructing module is specifically configured to: in the process of executing the service in the first network, change from the first network to the second network or the third network in the following manner: in a process of executing a voice service in the first network, performing a handover to the second network or the third network, and instructing the displaying module to display the first network name, where the service is the voice service.

With reference to the second possible implementation manner of the second aspect, in a third possible implementation manner, the instructing module is specifically configured to: in the process of executing the voice service in the first network, perform a handover to the second network or the third network in the following manner:

starting the voice service in a Long Term Evolution network, executing single radio voice call continuity or executing a packet-switched handover, performing the handover to the second network or the third network to execute the voice service, where the first network is the Long Term Evolution network, and the second network or the third network is a circuit switched domain network; or starting the voice service in a first 2G network or a first 3G network, executing reverse single radio voice call continuity, performing the handover to a 4G network or a second 3G network or a second 2G network to execute the voice service, and instructing the displaying module to display the first network name, where the first network is the first 2G network or the first 3G network, and the second network or the third network is the second 3G network, or the second network or the third network is the second 2G network, or the second network or the third network is the 4G network; or starting the voice service in a first 2G network or a first 3G network, executing a circuit-switched handover, and performing the handover to a second 3G network or a second 2G network to execute the voice service, where the first network is the first 2G network or the first 3G network, and the second network or the third network is the second 3G network, or the second network or the third network is the second 2G network.

With reference to the second aspect or any possible implementation manner of the first aspect, in a fourth possible implementation manner, the user equipment further includes a receiving module, where the receiving module is configured to receive a second network name of the second network or the third network; and the instructing module is specifically configured to instruct, in the following manner, the displaying module to display the first network name: acquiring the second network name received by the receiving module, and ignoring the second network name or instructing the displaying module to display the first network name.

With reference to the second aspect or any possible implementation manner of the first aspect, in a fifth possible implementation manner, the instructing module is further configured to: if the service is executed completely, instruct the displaying module to display the second network name, where the second network name is a network name of the second network or the third network; and the displaying module is configured to display the second network name indicated by the instructing module.

According to a third aspect, a user equipment UE is provided, where the UE includes: a processor, configured to:

execute an attach procedure to attach to a first network or execute a combined attach procedure to attach to the first network and a second network, and instruct a display screen to display a first network name; and in a process of executing a service in the first network, change from the first network to the second network or a third network, and instruct the display screen to display the first network name; and the display screen, configured to display the first network name indicated by the processor.

In a first possible implementation manner of the third aspect, the processor is specifically configured to: in the process of executing the service in the first network, change from the first network to the second network or the third network in the following manner: in a process of executing a circuit switched fallback CSFB service in the first network, falling back from the first network to the second network or the third network, where the first network is the Long Term Evolution network, the second network and the third network are circuit switched domain networks, and the service is the CSFB service.

In a second possible implementation manner of the third aspect, the processor is specifically configured to: in the process of executing the service in the first network, change from the first network to the second network or the third network in the following manner: in a process of executing a voice service in the first network, performing a handover to the second network or the third network, where the service is the voice service.

With reference to the second possible implementation manner of the third aspect, in a third possible implementation manner, the processor is specifically configured to: in the process of executing the voice service in the first network, perform a handover to the second network or the third network in the following manner:

starting the voice service in a Long Term Evolution network, executing single radio voice call continuity or executing a packet-switched handover, performing the handover to the second network or the third network to execute the voice service, where the first network is the Long Term Evolution network, and the second network or the third network is a circuit switched domain network; or starting the voice service in a first 2G network or a first 3G network, executing reverse single radio voice call continuity, performing the handover to a 4G network or a second 3G network or a second 2G network to execute the voice service, and instructing the display screen to display the first network name, where the first network is the first 2G network or the first 3G network, and the second network or the third network is the second 3G network, or the second network or the third network is the second 2G network, or the second network or the third network is the 4G network; or starting the voice service in a first 2G network or a first 3G network, executing a circuit-switched handover, and performing the handover to a second 3G network or a second 2G network to execute the voice service, where the first network is the first 2G network or the first 3G network, and the second network or the third network is the second 3G network, or the second network or the third network is the second 2G network.

With reference to the third aspect or any possible implementation manner of the third aspect, in a fourth possible implementation manner, the user equipment further includes a receiver, where the receiver is configured to receive a second network name of the second network or the third network; and the processor is specifically configured to instruct, in the following manner, the display screen to display the first network name: acquiring the second network name received by the receiver, and ignoring the second network name or instructing the display screen to display the first network name.

With reference to the third aspect or any possible implementation manner of the third aspect, in a fourth possible implementation manner, the processor is further configured to: if the service is executed completely, instruct the display screen to display the second network name, where the second network name is a network name of the second network or the third network; and the display screen is further configured to display the second network name indicated by the processor.

By using the foregoing technical solutions, it is ensured that a network name displayed on a terminal is consistent with a network name that is displayed on a UE and recorded by a network device, and the problem that the network name displayed on the UE changes in an execution process is avoided, thereby ensuring consistency of the network name displayed on the UE with the network name that is recorded by a network device, and improving user experience.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments, and a person skilled in the art may still derive other drawings from these accompanying drawings.

FIG. 2a is a flowchart of a method for displaying a network name according to another embodiment of the present invention;

DETAILED DESCRIPTION OF ILLUSTRATIVE EMBODIMENTS

Figure 1:
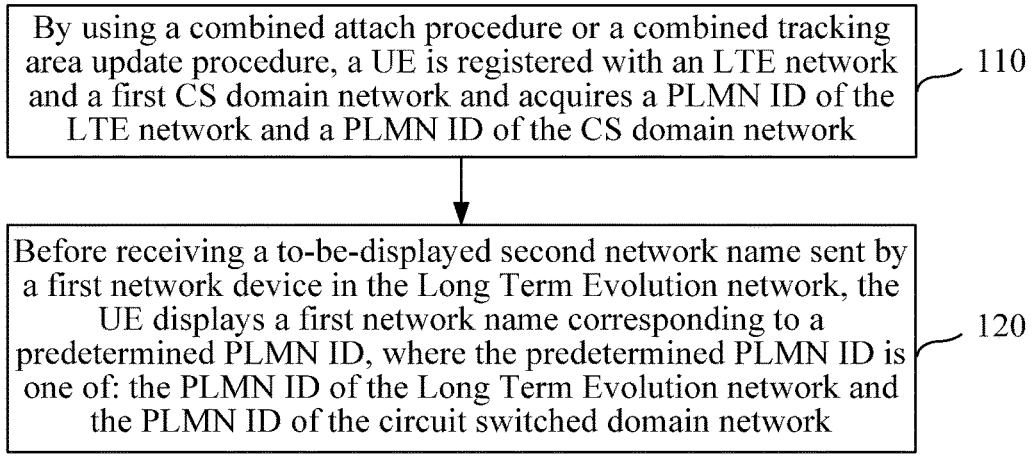
FIG. 1 is a flowchart of a method for displaying a network name according to an embodiment of the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

An embodiment of the present invention provides a method for displaying a network name.

It should be noted that all same concepts and same scenarios in the embodiments of the present invention are applicable to other embodiments, and in the embodiments of the present invention, the embodiments are not described in detail one by one.

For the foregoing policy 1 in which a UE displays a network name, because when the UE executes a combined attach procedure or a combined tracking area update procedure, or after the UE executes a combined attach procedure or a combined tracking area update procedure, the UE acquires a PLMN ID of an LTE network and a PLMN ID, selected by an MME, of a CS domain network; however, the PLMN ID of the LTE network and the PLMN ID of the CS domain network may be different; in this case, the UE does not know whether to display a network name according to the PLMN ID of the LTE network or according to the PLMN ID of the CS domain network. For example, when the LTE network and the CS domain network belong to different operators, the UE does not know whether to display a network name according to the PLMN ID of the LTE network or according to the PLMN ID of the CS domain network; or when the PLMN ID of the LTE network and the PLMN ID of the CS domain network are different but the LTE network and the CS domain network belong to a same operator, the UE needs to display either the LTE network or the CS domain network according to a PLMN ID.

It should be noted that a CS domain network in all the embodiments of the present invention may include a 2G network, or a 3G network, or a 1×RTT network of a Code Division Multiple Access (code division multiple access, CDMA) network.

In the combined attach procedure, the UE acquires a tracking area identity list (TAI List), a location area identity (LAI), and a globally unique temporary identity (GUTI) of the UE by receiving an attach accept message sent by the MME, where the TAI list and the GUTI include a PLMN ID of a LTE network with which the UE is registered, and the LAI includes a PLMN ID of a CS domain network with which the UE is registered, so that the UE acquires the PLMN ID of the LTE network and the PLMN ID of the CS domain network.

In the combined tracking area update procedure, the UE acquires a TAI list, a LAI, and a GUTI by receiving a tracking area update accept (TAU accept) message sent by the MME, where the TAI list and the GUTI includes a PLMN ID of an LTE network with which the UE is registered, the LAI includes a PLMN ID of a CS domain network with which the UE is registered, so that the UE acquires the PLMN ID of the LTE network and the PLMN ID of the CS domain network.

If the PLMN ID of the LTE network and the PLMN ID of the CS domain network that are acquired by the UE are different, the UE does not know whether to display a network name according to the PLMN ID of the LTE network or according to the PLMN ID of the CS domain network.

For the foregoing case, the method in this embodiment, as shown in FIG. 1, includes the following steps:

Step 110: By using a combined attach procedure or a combined tracking area update procedure, a UE is registered with an LTE network and a first CS domain network and acquires a PLMN ID of the LTE network and a PLMN ID of the CS domain network.

A method for executing the combined attach procedure by the UE and a method for executing the combined tracking area update procedure by the UE are the same as those in the prior art, which are not described in detail herein again. It should be noted that the combined attach procedure or the combined tracking area update procedure is completed by interacting by the UE with a network device in the LTE network, such as an MME, and with a network device in the CS domain network, such as an MSC server. In this specification, to describe an entity for executing each step more clearly, it is simply described that each step is executed by a single device.

In this step, when executing the combined attach procedure, the UE can acquire the PLMN ID of the LTE network and the PLMN ID of the CS domain network by using an attach accept message; and when executing the combined tracking area update procedure, the UE can acquire the PLMN ID of the LTE network and the PLMN ID of the CS domain network by using a TAU accept message.

It should be noted that all the embodiments of the present invention are described by using an LTE network as an example. In fact, the embodiments of the present invention are not limited to the LTE network, which may also be another pure-PS domain network. An executed method is the same as that in this embodiment of the present invention.

Step 120: Before receiving a second network name to be displayed, which is sent by a first network device in the Long Term Evolution network, the UE displays a first network name corresponding to a predetermined PLMN ID, where the predetermined PLMN ID is one of the PLMN ID of the Long Term Evolution network and the PLMN ID of the circuit switched domain network.

For example, before the UE receives the to-be-displayed network name sent by the network device, the UE displays a network name corresponding to the predetermined PLMN ID of the LTE network.

Alternatively, before receiving the to-be-displayed network name sent by the network device, the UE displays a network name corresponding to the predetermined PLMN ID of the CS domain network.

In this case, even if the UE obtains the PLMN ID of the LTE network or the PLMN ID of the CS domain network at the same time, a network name corresponding to a predetermined PLMN ID can also be displayed according to a preset rule.

It should be noted that, in this step, the first network name and the second network name may be the same, or may be different. It is noted herein that the first network name is a network name displayed on the UE according to a presetting of the UE, and the second network name is a network name received from the network device.

In this embodiment of the present invention, after the UE acquires the PLMN ID of the LTE network and the PLMN ID of the CS domain network, if the UE has not received a network name notified by a network device of the LTE network or the CS domain network, a network name corresponding to a predetermined PLMN ID in the PLMN ID of the LTE network and the PLMN ID of the CS domain network is displayed, so that the problem that it cannot be determined that which network name is to be displayed after a CSFB combined attach process or a combined location update process of the UE is solved, and a method for how to display a network name by a terminal is standardized.

In this embodiment of the present invention, that before the second network name to be displayed, which is sent by the first network device in the Long Term Evolution network is received indicates that the UE has not received the to-be-displayed network name sent by the network device.

In this step, that the UE displays a network name corresponding to a predetermined PLMN ID is that the UE displays the network name according to the preset rule.

For example, if the preset rule is that if the UE acquires the PLMN ID of the LTE network and the PLMN ID of the CS domain network, the network name corresponding to the PLMN ID of the LTE network is displayed, and then, in this step, the UE displays, according to the preset rule, the network name corresponding to the PLMN ID of the LTE network; or if the preset rule is that if the UE acquires the PLMN ID of the LTE network and the PLMN ID of the CS domain network, the network name corresponding to the PLMN ID of the CS domain network is displayed, and then, in this step, the UE displays, according to the preset rule, the network name corresponding to the PLMN ID of the CS domain network.

Optionally, that the UE displays the network name according to the preset rule may include that:

the UE separately determines whether an HPLMN ID is the same as the PLMN ID of the LTE network and whether the HPLMN ID is the same as the PLMN ID of the CS domain network:

if the HPLMN ID is the same as the PLMN ID of the LTE network, the network name corresponding to the PLMN ID of the LTE network is displayed;

if the HPLMN ID is the same as the PLMN ID of the CS domain network, the network name corresponding to the PLMN ID of the CS domain network is displayed; and if the HPLMN ID is different from both the PLMN ID of the LTE network and the PLMN ID of the CS domain network, the network name corresponding to the predetermined PLMN ID is displayed.

When the UE determines whether the HPLMN ID is the same as the PLMN ID of the LTE network and whether the HPLMN ID is the same as the PLMN ID of the CS domain network, a determining sequence may be arbitrary. For example, the UE may first determine whether the HPLMN ID is the same as the PLMN ID of the LTE network and then determine whether the HPLMN ID is the same as the PLMN ID of the CS domain network; or may first determine whether the HPLMN ID is the same as the PLMN ID of the CS domain network and then determine whether the HPLMN ID is the same as the PLMN ID of the LTE network, which is not limited in this embodiment of the present invention.

Optionally, the UE may prestore a correspondence between each PLMN ID and a network name. Certainly, this embodiment of the present invention is not limited thereto. The UE may further acquire, in another manner, a network name corresponding to a PLMN ID, for example, after acquiring a PLMN ID, the UE acquires a network name corresponding to the PLMN ID from the network device.

Figure 1A:
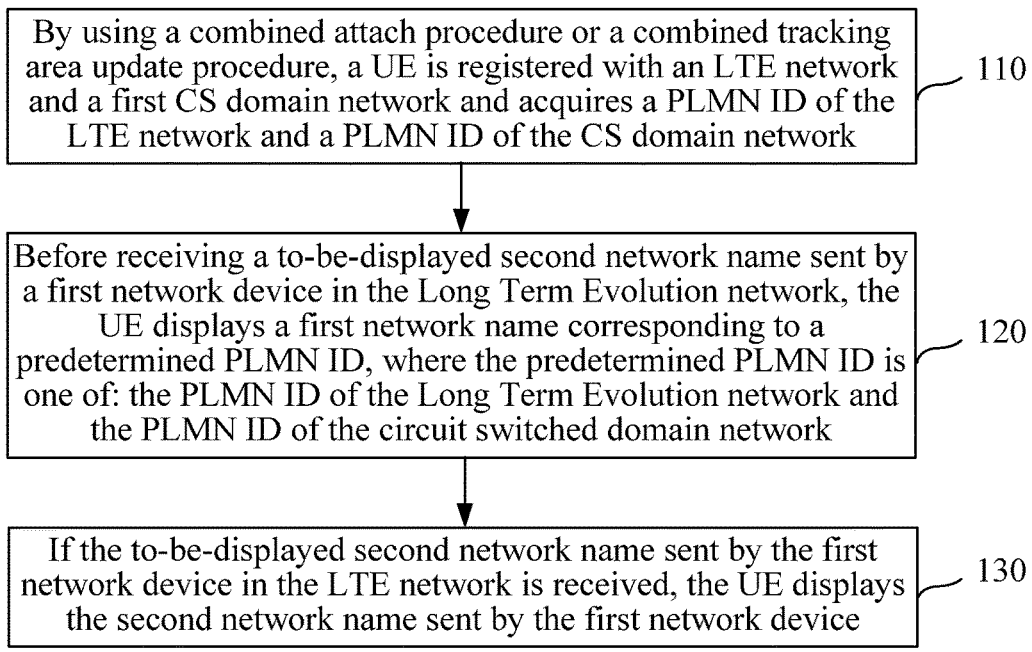
FIG. 1a is a flowchart of a method for displaying a network name according to another embodiment of the present invention.

Further, as shown in FIG. 1*a*, this embodiment of the present invention may further include:

Step 130: If the second network name to be displayed, which is sent by the first network device in the LTE network, is received, the UE displays the second network name sent by the first network device.

In this embodiment of the present invention, it is ensured that a network name displayed on a terminal is consistent with a network name that is displayed on a UE and recorded by a network device.

Figure 1B:
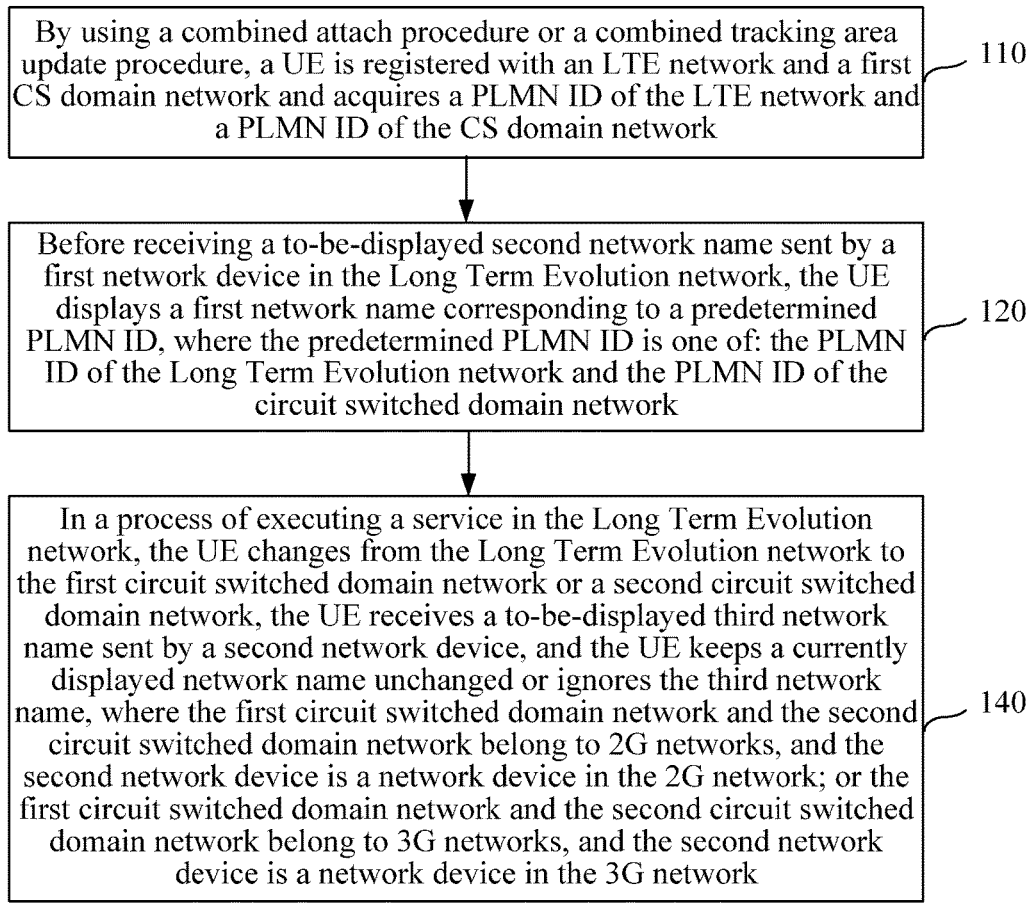
FIG. 1b is a flowchart of a method for displaying a network name according to another embodiment of the present invention.

Further, as shown in FIG. 1*b*, this embodiment of the present invention may further include:

Step 140: In a process of executing a service in the Long Term Evolution network, the UE changes from the Long Term Evolution network to a first circuit switched domain network or a second circuit switched domain network, the UE receives a third network name to be displayed, which is sent by a second network device, and the UE keeps a currently displayed network name unchanged or ignores the third network name, where the first circuit switched domain network and the second circuit switched domain network are 2G networks, and the second network device is a network device in the 2G network; or the first circuit switched domain network and the second circuit switched domain network are 3G networks, and the second network device is a network device in the 3G network.

Specifically, the UE falls back to the CS domain network in a process of executing a CSFB service, or is handed over to a 2G network or a 3G network in a process of executing a voice service, the UE receives a to-be-displayed network name sent by a network device in the 2G network or the 3G network to which the CS domain network belongs, and the UE keeps the currently displayed network name unchanged or ignores the to-be-displayed network name that is received. For details, reference may be made to the description in a subsequent embodiment.

For example, if the UE falls back to the CS domain network in the process of executing the CSFB service in the LTE network and receives the to-be-displayed network name sent by the network device, the UE ignores the received network name and displays a network name that is previously displayed.

For another example, if the UE is handed over to a PS domain network of 2G or 3G or is handed over to a CS domain network of 2G or 3G in the process of executing the voice service in the LTE network and receives the to-be-displayed network name sent by the network device, the UE ignores the received network name and displays a network name that is previously displayed.

In this embodiment of the present invention, it is ensured that a network name displayed on a terminal is consistent with a network name that is displayed on a UE and recorded by a network device, and the problem that the network name displayed on the UE changes in an execution process is avoided, thereby ensuring consistency of the network name displayed on the UE, and improving user experience.

Figure 2:
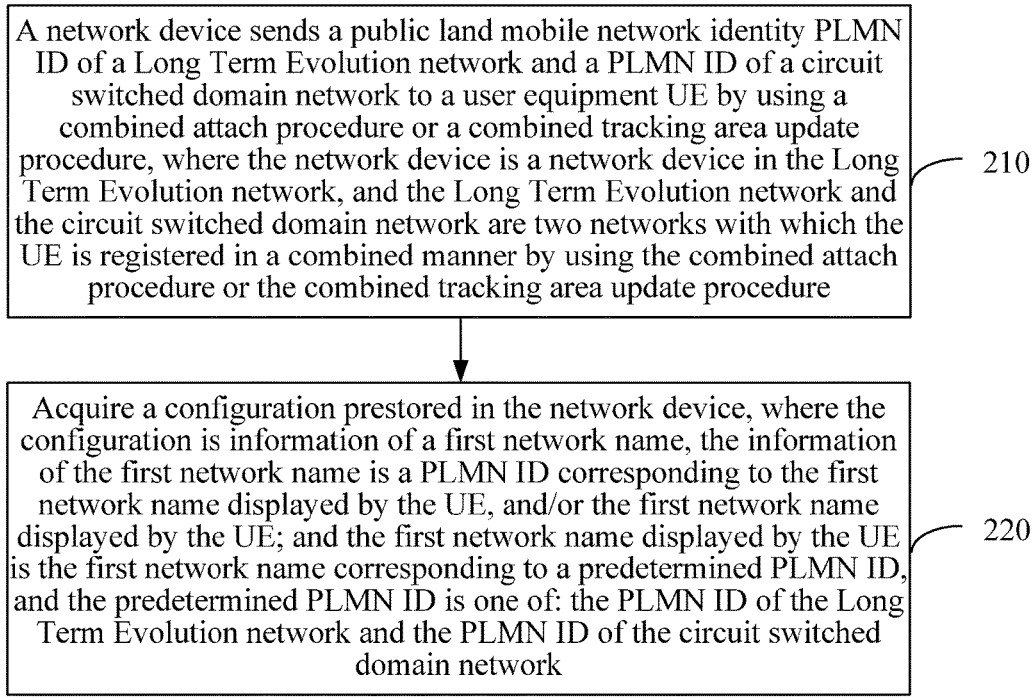
FIG. 2 is a flowchart of a method for displaying a network name according to another embodiment of the present invention.

Correspondingly, another embodiment of the present invention further provides a method for displaying a network name for a network device side in the foregoing embodiment. As shown in FIG. 2, this embodiment includes the following steps:

Step 210: A network device sends a public land mobile network identity PLMN ID of a Long Term Evolution network and a PLMN ID of a circuit switched domain network to a user equipment UE by using a combined attach procedure or a combined tracking area update procedure, where the network device is a network device in the Long Term Evolution network, and the Long Term Evolution network and the circuit switched domain network are two networks with which the UE is registered in a combined manner by using the combined attach procedure or the combined tracking area update procedure.

Step 220: Acquire a configuration prestored in the network device, where the configuration is information of a first network name, the information of the first network name is a PLMN ID corresponding to the first network name displayed on the UE, and/or the first network name displayed on the UE; and the first network name displayed on the UE is the first network name corresponding to a predetermined PLMN ID, and the predetermined PLMN ID is one of the PLMN ID of the Long Term Evolution network and the PLMN ID of the circuit switched domain network.

To enable a network name displayed on the UE and a network name that is displayed on the UE and recorded by a network device to be consistent, setting may be performed in advance on the network device, the setting is the same as a preset rule on the UE, so that the network name that is displayed on the UE and recorded on the network device is consistent with a network name that is actually displayed on the UE. In this embodiment of the present invention, it is ensured that a network name displayed on a terminal is consistent with a network name that is displayed on a UE and recorded by a network device, thereby improving user experience.

In this embodiment, before the configuration prestored in the network device is acquired, as shown in FIG. 2a, the method may further include:

Step 211: The network device determines whether a home PLMN ID of the UE is the same as the PLMN ID of the Long Term Evolution network and the PLMN ID of the circuit switched domain network.

That the configuration prestored in the network device is acquired includes that: if the home PLMN ID is different from both the PLMN ID of the Long Term Evolution network and the PLMN ID of the circuit switched domain network, the configuration prestored in the network device is acquired.

Further, as shown in FIG. 2a, the method in this embodiment may further include:

Step 230: If the network device determines that information of a second network name to be displayed on the UE needs to be sent to the UE, the network device sends the information of the second network name to the UE, so that the UE displays the second network name corresponding to the information of the network name.

That the network device determines whether the information of the network name to be displayed on the UE needs to be sent to the UE may include that:

the network device determines whether an operator to which the PLMN ID of the LTE network with which the UE is registered in a combined manner belongs is the same as an operator to which the PLMN ID of the circuit switched domain network belongs. If the operator to which the PLMN ID of the LTE network with which the UE is registered in a combined manner belongs is different from the operator to which the PLMN ID of the circuit switched domain network belongs, the network device needs to send the network name to the UE.

It should be noted that the network device in the LTE network in this embodiment may be an MME, and the UE may receive the to-be-displayed network name by receiving EMM information sent by the network device. In this case, if the MME does not send the EMM information to the UE, the MME also has a preset rule that is the same as that of the UE, so that the MME can learn that a PLMN ID corresponding to the network name displayed on the UE is which one of the PLMN ID of the LTE network and the PLMN ID of the CS domain network.

Another embodiment of the present invention provides a method for displaying a network name.

For the foregoing policy 2, the EMM Information message sent by the MME is an optional message, that is, the MME may not send the EMM Information message to the UE. However, if the MME does not send the EMM Information message to the UE, the MME does not know whether the UE displays a network name corresponding to the PLMN ID of the LTE network or a network name corresponding to the PLMN ID of the CS domain.

In another aspect, when performing a VoIP service in a 3G network (such as a High Speed Uplink Packet Access (HSPA) network, the UE is handed over to the LTE network. In this case, because the UE displays a network name of the 3G network when a user dials or accepts or triggers the VoIP service, the user determines, according to a network name currently displayed on the UE, that a network in which the UE currently resides or a network that serves the UE is the 3G network. However, if, in a process of executing the VoIP service, the UE executes a PS handover (HO) to be handed over to the LTE network, the UE executes a combined tracking area update procedure in the LTE network, the UE receives the EMM information message sent by the MME of the LTE network, and the UE displays a network name notified by the EMM information message. If the network name of the 3G network and the network name notified by the EMM Information message are different, user experience may be deteriorated and a complaint may be caused. Therefore, in order to avoid this problem, in this VoIP service process, a change of the network name displayed on the UE, which is caused by execution of the PS HO, should be avoided.

Alternatively, when the UE executes a voice service of a CS domain in a 2G network or a 3G network, the network name displayed on the UE may be a network name of the 2G network or the 3G network. However, when reverse single radio voice call continuity (rSRVCC) needs to be executed in a process of executing voice service continuity, the UE is handed over to an LTE network or the 3G network, the UE displays a corresponding network name according to a PLMN ID of the currently used LTE network or 3G network; or if the UE receives a GMM information message or an EMM information message sent by an SGSN or an MME in the LTE network or the 3G network, the UE displays a network name notified by the GMM Information message or the EMM information message. In this case, a network name displayed when the UE triggers the voice service of the CS domain may be inconsistent with a network name displayed when the UE is handed over to the LTE or the 3G network.

Figure 3:
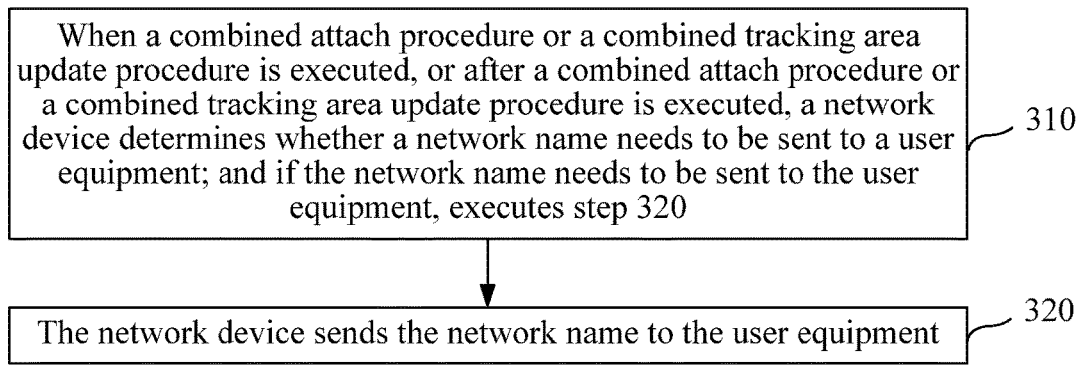
FIG. 3 is a flowchart of a method for displaying a network name according to another embodiment of the present invention.

To solve the foregoing problem, the method in this embodiment, as shown in FIG. 3, includes the following steps:

Step 310: When a combined attach procedure or a combined tracking area update procedure is executed, or after a combined attach procedure or a combined tracking area update procedure is executed, a network device determines whether a network name needs to be sent to a user equipment; and if the network name needs to be sent to the user equipment, executes step 320.

This step specifically includes that: the network device determines an operator to which a PLMN ID of a LTE network belongs is the same as an operator to which a PLMN ID of a CS domain network belongs; and if the operator to which the PLMN ID of the LTE network belongs is different from the operator to which the PLMN ID of the CS domain network belongs, the network device needs to send the network name to the UE, and executes step 320; or this step specifically includes that: the network device determines whether a user equipment is handed over to an LTE network in a voice execution process; and if yes, the network device needs to send the network name to the UE, and executes step 320.

Step 320: The network device sends the network name to the user equipment.

In this step, if the network device determines that the UE is handed over to the LTE network or a 3G network in a voice service process, in this step, the network device sends the network name to the UE, where the network name is a network name of a 3G network in which the UE is located when the voice service is started.

In this way, the UE can display a received network name, and the received network name is consistent with the network name when the UE starts the voice service, so that a change of the displayed network name is avoided.

In addition, if the operator to which the PLMN ID of the LTE network belongs is different from the operator to which the PLMN ID of the CS domain network belongs, the network device sends the network name to the UE, where the network name may be a network name corresponding to a home PLMN ID of the network device, or may be a network name corresponding to the PLMN ID of the LTE network, or may be a network name corresponding to the PLMN ID of the CS domain network.

Specifically, the network device may be an MME, and the MME may send the network name to the user equipment by using an EMM information message. Certainly, the network device may also send the network name to the user equipment by using another message.

A difference from the prior art lies in that, in this embodiment, if the MME determines that the operator to which the PLMN ID of the LTE network belongs is different from the operator to which the PLMN ID of the CS domain network belongs, the EMM information message is a message that must be sent, but not an optional message.

Further, in this embodiment, if the operator to which the PLMN ID of the LTE network belongs is the same as the operator to which the PLMN ID of the CS domain network belongs, the MME may send the EMM information message to the UE, or may not send the EMM information message to the UE. That is, if the operator to which the PLMN ID of the LTE network belongs is the same as the operator to which the PLMN ID of the CS domain network belongs, the EMM information message is an optional message.

In this embodiment of the present invention, if an MME determines an operator to which a PLMN ID of an LTE network belongs is different from an operator to which a PLMN ID of a CS domain network belongs, the MME sends an EMM Information message to a UE, where the message is a message that must be sent, so that the problem that, in an execution process or after an execution process of an CSFB combined attach procedure and a combined tracking area update procedure, the UE cannot determine which network name is to be displayed is avoided, and it is ensured that a network name displayed on a terminal is consistent with a network name displayed on the UE and recorded by a network device, and the problem that the network name displayed on the UE changes in the execution process is avoided, thereby ensuring consistency of the network name displayed on the UE, and improving user experience.

Another embodiment of the present invention provides a method for displaying a network name.

In the prior art, when a UE attaches to an LTE network, the UE displays a network name of the LTE network. However, when a CSFB service triggers the UE to fall back to a 2G network or a 3G network, the UE displays a network name of t 2G network or a 3G network in which the UE currently resides. Alternatively, if the UE falls back to a 2G network or a 3G network, and the UE receives a GPRS mobility management information (GMM information) message sent by an SGSN of the 2G network or the 3G network, or the UE receives a mobility management information (MM Information) message sent by an MSC/VLR of the 2G network or the 3G network, the UE displays a network name notified by the GMM information message or the MM information message.

Alternatively, in the prior art, when a UE performs a Voice over Internet Protocol (VoIP) service in a 3G network, the UE is handed over to an LTE network. In this case, because the UE displays a network name of a 3G network when a user dials or accepts or triggers the VoIP service, the user determines, according to a network name currently displayed on the UE, that a network in which the UE currently resides or a network that serves the UE is the 3G network. However, if, in a process of executing the VoIP service, the UE executes a PS handover to be handed over to the LTE network and executes a combined tracking area update procedure in the LTE network, the UE displays a network name notified by received EMM information; or, if the UE has not received EMM information, the UE displays a network name of a network in which the UE is currently located.

However, if a network name displayed after the UE attaches to the LTE network is inconsistent with a network name displayed when the UE falls back to the 2G network or the 3G network, or is inconsistent with a network name displayed on the UE in a VoIP service execution process, poor user experience is caused, and it is easy to cause a user complaint.

For example, in a process of executing a CSFB service, when the user dials or accepts or triggers the CSFB service, the network name displayed on the UE may be a network name of the LTE network. However, when the UE falls back to the 2G network, the UE displays a corresponding network name according to a PLMN ID of the currently used 2G network, or when the UE falls back to the 3G network, the UE displays a corresponding network name according to a PLMN ID of the currently used 3G network. Alternatively, if the UE receives a GMM information message sent by an SGSN of the 2G network or the 3G network, or the UE receives an MM information message sent by an MSC/VLR of the 2G network or the 3G network, the UE displays a network name notified by the GMM information message or the MM information message. In this case, a network name displayed when the user dials or accepts or triggers the CSFB service may be inconsistent with a network name displayed when the UE falls back to the 2G network or the 3G network.

For another example, after the UE triggers a VoIP service in the LTE network, a user determines, according to a network name currently displayed on the UE, a network in which the UE currently resides or a network that currently serves the UE. In this case, the network name displayed on the UE may be a network name of the LTE network. However, when single radio voice call continuity (SRVCC) needs to be executed in a process of executing the VoIP voice service, the UE is handed over to a 2G network or a 3G network; in this case, the UE displays a corresponding network name according to a PLMN ID of the currently used 2G network or 3G network; or if the UE receives a GMM information message sent by the SGSN of the 2G network or the 3G network, or if the UE receives an MM information message sent by an MSC/VLR of the 2G network or the 3G network, the UE displays a network name notified by the GMM information message or the MM information message. In this case, a network name displayed when the UE triggers the VoIP service may be inconsistent with a network name displayed when the UE falls back to the 2G network or the 3G network.

For another example, when the UE executes a voice service of a CS domain in the 2G network or the 3G network, the network name displayed on the UE may be a network name of the 2G or 3G network. However, when reverse single radio voice call continuity (rSRVCC) needs to be executed in a process of executing voice service continuity, the UE is handed over to the LTE network or the 3G (for example, HSPA) network; in this case, the UE displays a corresponding network name according to a PLMN ID of the currently used LTE network or 3G network; or if the UE receives a GMM information message sent by an SGSN of the LTE network or the 3G network or receives an EMM information message sent by an MME, or if the UE receives an MM information message sent by an MSC/VLR of the 3G network, the UE displays a network name notified by the GMM information, the EMM information message, or the MM information message. In this case, a network name displayed when the UE triggers the voice service of the CS domain may be inconsistent with a network name displayed when the UE is handed over to the LTE or the 3G network.

For another example, when the UE executes a voice service of a CS domain in the 2G network or the 3G network, the network name displayed on the UE may be a network name of the 2G network or the 3G network. However, when the UE needs to execute a CS handover (CS handover, CS HO) in a process of executing voice service continuity, so as to hand over to another 2G network or 3G network, the UE displays a corresponding network name according to a PLMN ID of a 2G network or 3G network used after the handover; or if the UE receives a GMM information message sent by an SGSN/MME of the 2G network or the 3G network, or if the UE receives an MM information message sent by an MSC/VLR of the 2G network or the 3G network, the UE displays a network name notified by the GMM information message or the MM information message. In this case, a network name displayed when the UE triggers the voice service of the CS domain may be inconsistent with a network name displayed when the UE is handed over to another 2G network or 3G network.

Figure 4:
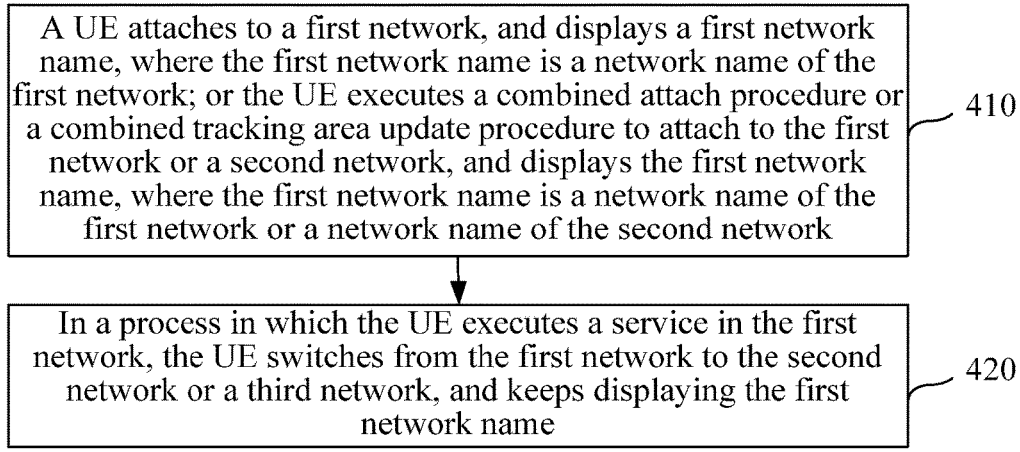
FIG. 4 is a flowchart of a method for displaying a network name according to another embodiment of the present invention.

For the foregoing case, the method in this embodiment, as shown in FIG. 4, includes the following steps:

Step 410: A UE attaches to a first network, and displays a first network name, where the first network name is a network name of the first network; or the UE executes a combined attach procedure or a combined tracking area update procedure to attach to the first network or a second network, and displays the first network name, where the first network name is a network name of the first network or a network name of the second network.

In this step, the first network and the second network may be one of an LTE network and a CS domain network, where the CS domain network belongs to a 2G network or a 3G network. For how the UE attaches to the LTE network, the 2G network, or the 3G network and how the UE executes combined attach to attach to the first network and the second network, reference may be made to a method in the prior art, which are not described in detail again in this embodiment of the present invention. If the UE attaches only to the first network, the first network name is the network name of the first network; and if the UE attaches to the first network and the second network in a combined manner, the first network name may be the network name of the first network, or may be the network name of the second network.

For example, if the UE attaches only to the LTE network, the first network is the LTE network, and the first network name displayed on the UE is a network name of the LTE network; if the UE attaches only to one of the 2G network and the 3G network, the first network is the 2G network or the 3G network to which the UE attaches, and the first network name displayed on the UE is a network name of the corresponding 2G network or 3G network; if the UE attaches to the LTE network and the CS domain network in a combined manner, the first network is one of the LTE network and the CS domain network, the second network is the other of: the LTE network and the CS domain network, and the first network name displayed on the UE may be the network name of the LTE network or may be a network name of the CS domain network; and if the UE attaches to the 2G network and the 3G network in a combined manner, the first network is one of the 2G network and the 3G network, the second network is the other of: the 2G network and the 3G network, and the first network name displayed on the UE may be the network name of the 2G network or may be the network name of the 3G network.

Step 420: In a process in which the UE executes a service in the first network, the UE changes from the first network to the second network or a third network, and the UE keeps displaying the first network name.

The third network may be one of the LTE network and the CS domain network, and is different from the first network.

In this step, for example, if the first network is the LTE network, in the process of executing the service, the UE is handed over or falls back from the first network to the second network or the third network. For example, if the UE falls back to the third network when executing a CSFB service, or when executing a voice service, executes an SRVCC handover or PS HO handover process to be handed over to the third network, the UE displays the first network name. Therefore, in this embodiment, the UE falls back from the LTE network or is handed over to the 2G network or the 3G network, and after the handover or the fallback, the UE still keeps displaying the first network name but does not display a second network name. The second network name is a network name of the third network or the second network.

For example, after the UE attaches to the LTE network and a first CS domain network in a combined manner, the first network name that is displayed may be the network name of the LTE network or a network name of the first CS domain network. In this case, when a user dials or accepts or triggers a CSFB service, the user determines, according to a network name currently displayed on the UE, a network in which the UE currently resides or a network that currently serves the UE. In this case, the UE displays the first network name. When the UE falls back to a second CS domain network, in a CSFB service period, a change of the network name displayed on the UE, which is caused by execution of the CSFB service, should be avoided. Therefore, the UE keeps displaying the first network name, thereby improving user experience. The first CS domain network may be the same as or may be different from the second CS domain network.

For another example, when the UE triggers a VoIP service in the LTE network, the network name of the LTE network is displayed. If SRVCC needs to be executed, for example, the SRVCC needs to be executed when a signal of the VoIP service is interrupted, the UE is handed over to the 2G network or the 3G network. In this case, a change of the network name displayed on the UE, which is caused by execution of the SRVCC, should be avoided. Therefore, the UE keeps displaying the network name of the LTE network, so as to improve user experience.

For another example, when the UE triggers a VoIP service in the LTE network, the network name of the LTE network is displayed. If a PS handover needs to be executed, the UE is handed over to the 3G (for example, HSPA) network. In this case, a change of the network name displayed on the UE changes, which is caused by execution of the PS handover, should be avoided. Therefore, the UE keeps displaying the network name of the LTE network, so as to improve user experience.

Specifically, after the UE attaches to the LTE network, if the UE falls back or is handed over to the 2G or 3G network, and receives a GMM information message sent by an SGSN of the 2G network or the 3G network or receives an MM information message sent by an MSC/VLR, the UE does not change a network name displayed previously, that is, the UE ignores a network name notified by the GMM information message or the MM information message. Alternatively, if the UE falls back or is handed over to the 2G or 3G network, the UE does not display the network name according to a PLMN ID of the 2G network or 3G network in which the UE resides.

The CSFB service includes a voice service, a location service (LCS), and a call independent supplementary service (CISS).

For another example, when executing a VoIP service in the 3G network, the UE is handed over to the LTE network. In this case, because a user dials or accepts or triggers the VoIP service, the UE displays the network name of the 3G network. If, in a process in which the UE executes the VoIP service, the UE executes a PS handover (HO) to be handed over to the LTE network, the UE keeps displaying the network name of the LTE network, so as to improve user experience.

For another example, in a process of executing a voice service of a CS domain in the 2G or 3G network, when the UE needs to execute an rSRVCC handover to be handed over to the LTE or 3G network or the UE needs to execute a CS handover to be handed over to another 2G or 3G network in a process of executing a voice service of a CS domain in the 2G or 3G network, a change of the network name displayed on the UE, which is caused by execution of the rSRVCC or CS handover, should be avoided. Therefore, the UE keeps displaying a network name of a network that initially triggers the voice service, so as to improve user experience.

Specifically, when the UE receives an EMM information message sent by an MME of the LTE network after the UE is handed over to the LTE network, or when the UE receives a GMM information or MM information message sent by an SGSN or an MSC/VLR after the UE is handed over to the 2G or 3G network, the UE does not change a network name displayed previously, that is, the UE ignores a network name notified by the EMM Information or the GMM information or the MM information. Alternatively, after the UE is handed over to the LTE network or the CS domain network, the UE does not display the network name according to a PLMN ID of the LTE network or CS domain network in which the UE currently resides.

In this embodiment of the present invention, if a UE falls back or is handed over to a 2G network or a 3G network, or is handed over from a first network to a third network, the UE displays a network name before the fallback or the handover, but does not change the displayed network name, so that the problem that the network name displayed on the UE changes in a process of executing services such as a CSFB service and a voice service is avoided, thereby ensuring consistency of the network name displayed on the UE, and improving user experience.

Optionally, in this embodiment, when the service executed in step 420 is ended, the UE may change the displayed network name, that is, the UE may change display of the first network name to display of the second network name. For example, in this case, the UE may display the second network name notified by the EMM information, GMM information, or MM information message, or may display the second network name according to a PLMN ID of a network in which the UE is currently located, or the like.

Figure 5:
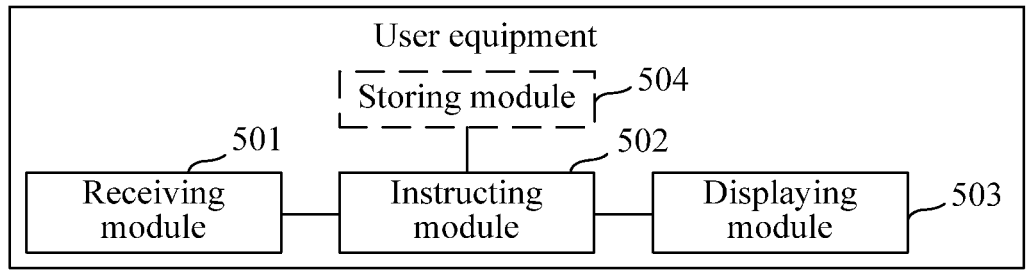
FIG. 5 is a schematic structural diagram of a user equipment according to an embodiment of the present invention.

Based on the method provided in the foregoing embodiment, an embodiment further provides a user equipment, where the user equipment can execute the method for displaying a network name in the foregoing embodiment of the present invention. In this embodiment, only a structure of the user equipment is simply described. For a specific principle, reference may be made to the description in the method embodiment. As shown in FIG. 5, the user equipment includes:

a receiving module 501, configured to receive a public land mobile network identity PLMN ID of an Long Term Evolution network or a PLMN ID of a first circuit switched domain network by executing a combined attach procedure or a combined tracking area update procedure, where the Long Term Evolution network and the first circuit switched domain network are two networks with which the UE is registered by using the combined attach procedure or the combined tracking area update procedure;

an instructing module 502, configured to acquire the PLMN ID of the Long Term Evolution network and the PLMN ID of the first circuit switched domain network that are received by the receiving module 501; and before a second network name to be displayed, which is sent by a first network device in the Long Term Evolution network, is acquired, acquire a first network name corresponding to a predetermined PLMN ID, and instruct a displaying module 503 to display the first network name, where the predetermined PLMN ID is one of the PLMN ID of the Long Term Evolution network and the PLMN ID of the first circuit switched domain network; and the displaying module 503, configured to display a network name indicated by the instructing module 502.

The instructing module 502 may be specifically configured to acquire, in the following manner, the first network name corresponding to the predetermined PLMN ID: determining whether a home PLMN ID is the same as the PLMN ID of the Long Term Evolution network and the PLMN ID of the first circuit switched domain network; and if the home PLMN ID is different from both the PLMN ID of the Long Term Evolution network and the PLMN ID of the first circuit switched domain network, acquiring the first network name corresponding to the predetermined PLMN ID.

Further, the user equipment may further include:

a storing module 504, configured to store a PLMN ID and a corresponding network name, and store the predetermined PLMN ID;

where the instructing module 502 is specifically configured to acquire, in the following manner, a first network name corresponding to the predetermined PLMN ID: acquiring, from the storing module 504, the predetermined PLMN ID and the first network name corresponding to the predetermined PLMN ID.

Further, the receiving module 501 may be further configured to receive the second network name to be displayed, which is sent by the first network device in the Long Term Evolution network; and the instructing module 502 is further configured to acquire the second network name received by the receiving module 501, and instruct the displaying module to display the second network name.

Further, the receiving module 501 is further configured to receive a third network name in a process of changing from the Long Term Evolution network to the first circuit switched domain network or a second circuit switched domain network, where the first circuit switched domain network and the second circuit switched domain network belong to 2G networks or 3G networks, and the third network name is received from a second network device in the 2G network or the 3G network; and the instructing module 502 is further configured to: in a process of executing a service in the Long Term Evolution network, change from the Long Term Evolution network to the first circuit switched domain network or the second circuit switched domain network, acquire the third network name received by the receiving module 501, and keep a currently displayed network name unchanged or ignore the third network name.

The service is a circuit switched fallback CSFB service, and the instructing module is specifically configured to: in the process of executing the service in the Long Term Evolution network, change from the Long Term Evolution network to the first circuit switched domain network or the second circuit switched domain network in the following manner: executing the CSFB service, and falling back from the Long Term Evolution network to the first circuit switched domain network or the second circuit switched domain network; or the service is a voice service, and the instructing module is specifically configured to: in the process of executing the service in the Long Term Evolution network, change from the Long Term Evolution network to the first circuit switched domain network or the second circuit switched domain network in the following manner: when the voice service is executed, performing the handover to the 2G network or the 3G network to execute the voice service.

The user equipment in this embodiment can execute the method in the foregoing embodiment. For details, reference may be made to the description in the foregoing embodiment. Moreover, a technical effect that can be achieved by the user equipment is the same as that in the foregoing embodiment, which is not described in detail herein again.

Figure 6:
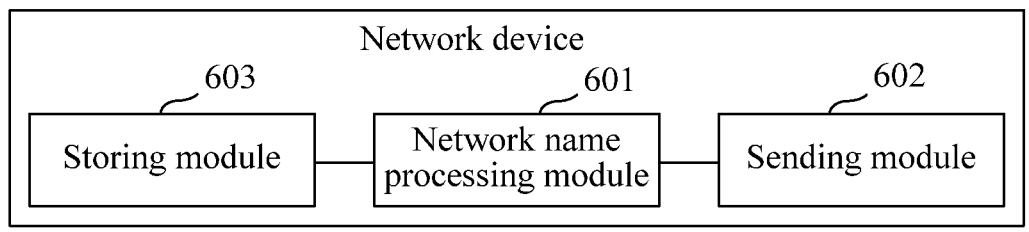
FIG. 6 is a schematic structural diagram of a network device according to an embodiment of the present invention.

Based on the method provided in the foregoing embodiment, an embodiment further provides a network device, where the network device can execute the method for displaying a network name in the embodiment corresponding to the foregoing network device of the present invention. In this embodiment, only a structure of the network device is simply described. For a specific principle, reference may be made to the description in the method embodiment. As shown in FIG. 6, the network device includes:

a sending module 602, configured to send a public land mobile network identity PLMN ID of a Long Term Evolution network and a PLMN ID of a circuit switched domain network to a user equipment UE by using a combined attach procedure or a combined tracking area update procedure, where the network device is a network device in the Long Term Evolution network, and the Long Term Evolution network and the circuit switched domain network are two networks with which the UE is registered in a combined manner by using the combined attach procedure or the combined tracking area update procedure;

a storing module 603, configured to store a first configuration, where the first configuration is information of a first network name, the information of the first network name is a predetermined PLMN ID and/or the first network name corresponding to the predetermined PLMN ID, the first network name is a network name displayed on the UE according to a second configuration in the UE, the first configuration is the same as the second configuration, and the predetermined PLMN ID is one of the PLMN ID of the Long Term Evolution network and the PLMN ID of the circuit switched domain network; and a network name processing module 601, configured to: after the sending module send the PLMN ID of the Long Term Evolution network and the PLMN ID of the circuit switched domain network to the UE, acquire the first configuration stored by the storing module 603.

The network name processing module 601 is specifically configured to acquire the first configuration stored by the storing module in the following manner: determining whether a home PLMN ID of the UE is the same as the PLMN ID of the Long Term Evolution network and the PLMN ID of the circuit switched domain network; and if the home PLMN ID is different from both the PLMN ID of the Long Term Evolution network and the PLMN ID of the circuit switched domain network, acquiring the first configuration stored by the storing module 603.

Further, the network name processing module 601 may be further configured to determine whether an operator to which the PLMN ID of the Long Term Evolution network belongs is the same as an operator to which the PLMN ID of the circuit switched domain network belongs; and if different, instruct the sending module 602 to send information of a second network name; and the sending module 602 is further configured to send the information of the second network name to the UE, where the information of the second network name is indicated by the network name processing module 601.

If the network device is a mobility management entity MME, the sending module is specifically configured to send the information of the second network name to the UE by using a universal mobile telecommunications system terrestrial radio access network E-UTRAN mobility management information EMM information message.

The network device in this embodiment can execute the method in the foregoing embodiment. For details, reference may be made to the description in the foregoing embodiment. Moreover, a technical effect that can be achieved by the network device is the same as that in the foregoing embodiment, which is not described in detail herein again.

Figure 7:
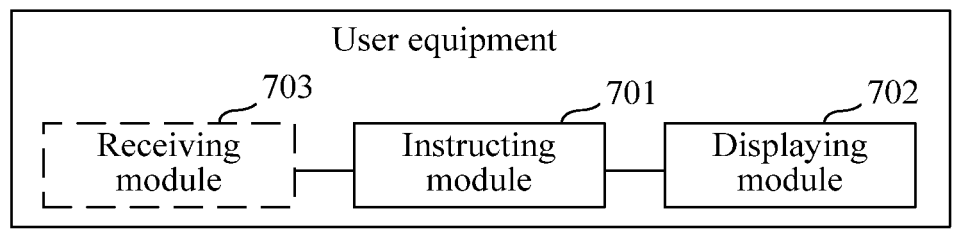
FIG. 7 is a schematic structural diagram of a user equipment according to another embodiment of the present invention.

Based on the method provided in the foregoing embodiment, an embodiment further provides a network device, where the network device can execute the method for displaying a network name in the foregoing third embodiment of the present invention. In this embodiment, only a structure of the network device is simply described. For a specific principle, reference may be made to the description in the foregoing method embodiment. As shown in FIG. 7, the network device includes:

an instructing module 701, configured to:

execute an attach procedure to attach to a first network, or execute a combined attach procedure to attach to the first network and a second network, and instruct a displaying module to display a first network name; and in a process of executing a service in the first network, change from the first network to the second network or a third network, and instruct the displaying module 702 to display the first network name; and the displaying module 702, configured to display the first network name indicated by the instructing module 701.

Optionally, the instructing module 701 is specifically configured to: in a process of executing a circuit switched fallback CSFB service in the first network, fall back from the first network to the second network or the third network, and instruct the displaying module to display the first network name, where the first network is a Long Term Evolution network, the second network and the third network are circuit switched domain networks, and the service is the CSFB service.

Optionally, the instructing module 701 is specifically configured to: in a process of executing a voice service in the first network, be handed over to the second network or the third network, and instruct the displaying module to display the first network name, where the service is the voice service.

Optionally, the instructing module 701 is specifically configured to: in the process of executing the voice service in the first network, be handed over to the second network or the third network in the following manner:

starting the voice service in a Long Term Evolution network, executing single radio voice call continuity or executing a packet-switched handover, performing the handover to the second network or the third network to execute the voice service, where the first network is the Long Term Evolution network, and the second network or the third network is a circuit switched domain network; or starting the voice service in a first 2G network or a first 3G network, executing reverse single radio voice call continuity, performing the handover to a 4G network or a second 3G network or a second 2G network to execute the voice service, and instructing the displaying module to display the first network name, where the first network is the first 2G network or the first 3G network, and the second network or the third network is the second 3G network, or the second network or the third network is the second 2G network, or the second network or the third network is the 4G network; or starting the voice service in a first 2G network or a first 3G network, executing a circuit-switched handover, and performing the handover to a second 3G network or a second 2G network to execute the voice service, where the first network is the first 2G network or the first 3G network, and the second network or the third network is the second 3G network, or the second network or the third network is the second 2G network.

The user equipment may further include a receiving module 703, where the receiving module 703 is configured to receive a second network name of the second network or the third network; and the instructing module 701 is specifically configured to instruct, in the following manner, the displaying module 702 to display the first network name: acquiring the second network name received by the receiving module 703, and ignoring the second network name or instructing the displaying module 702 to display the first network name.

Optionally, the instructing module 701 is further configured to: if the service is executed completely, instruct the displaying module 702 to display the second network name, where the second network name is a network name of the second network or the third network; and the displaying module 702 is configured to display the second network name indicated by the instructing module 701.

The network device in this embodiment can execute the method in the foregoing embodiment. For details, reference may be made to the description in the foregoing embodiment. Moreover, a technical effect that can be achieved by the user equipment is the same as that in the foregoing embodiment, which is not described in detail herein again.

In addition, an embodiment of the present invention further provides a communications system, including the user equipment and the network device in the foregoing embodiments. For specific structures and functions of the user equipment and the network device, reference may be made to the foregoing embodiments, which are not described in detail herein again.

Figure 8:
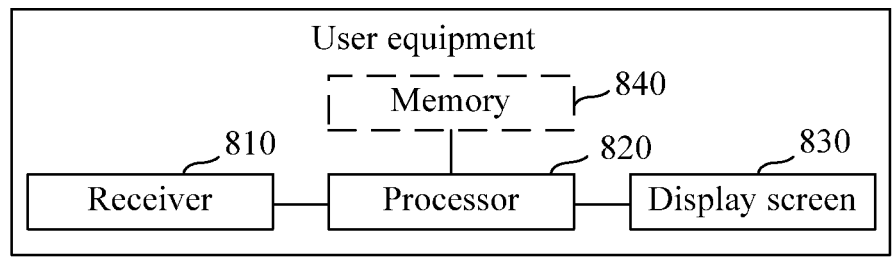
FIG. 8 is a schematic structural diagram of a user equipment according to another embodiment of the present invention.

Another embodiment of the present invention further provides a user equipment, where the user equipment can execute the method for displaying a network name in the foregoing embodiment of the present invention. In this embodiment, only a structure of the user equipment is simply described. For a specific principle, reference may be made to the description in the foregoing method embodiment. As shown in FIG. 8, the user equipment UE includes a receiver 810, a processor 820, and a display screen 830.

The receiver 810 is configured to receive a public land mobile network identity PLMN ID of an Long Term Evolution network or a PLMN ID of a first circuit switched domain network by executing a combined attach procedure or a combined tracking area update procedure, where the Long Term Evolution network and the first circuit switched domain network are two networks with which the UE is registered by using the combined attach procedure or the combined tracking area update procedure.

The processor 820 is configured to acquire the PLMN ID of the Long Term Evolution network and the PLMN ID of the first circuit switched domain network that are received by the receiver 810; and before a second network name to be displayed, which is sent by a first network device in the Long Term Evolution network is acquired, acquire a first network name corresponding to a predetermined PLMN ID, and instruct the display screen to display the first network name, where the predetermined PLMN ID is one of the PLMN ID of the Long Term Evolution network and the PLMN ID of the circuit switched domain network; and the display screen 830 is configured to display a network name indicated by the processor 820.

Because the user equipment in this embodiment can execute the method in the foregoing embodiment, a technical effect that can be achieved by the user equipment is the same as that in the foregoing embodiment, which is not described in detail herein again.

Further, the processor 820 is specifically configured to acquire, in the following manner, the first network name corresponding to the predetermined PLMN ID: determining whether a home PLMN ID is the same as the PLMN ID of the Long Term Evolution network and the PLMN ID of the circuit switched domain network; and if the home PLMN ID is different from both the PLMN ID of the Long Term Evolution network and the PLMN ID of the circuit switched domain network, acquiring the first network name corresponding to the predetermined PLMN ID.

In addition, the user equipment may further include:

a memory 840, configured to store different PLMN IDs and corresponding network names, and store the predetermined PLMN ID;

where the processor 820 is specifically configured to acquire, in the following manner, a first network name corresponding to a predetermined PLMN ID: acquiring, from the memory, the predetermined PLMN ID and the first network name corresponding to the predetermined PLMN ID.

Further, the receiver 810 is further configured to receive the second network name sent by the first network device in the Long Term Evolution network; and the processor 820 is further configured to acquire the second network name received by the receiver, and instruct the display screen to display the second network name.

Further, the receiver 810 is further configured to receive a third network name in a process of changing from the Long Term Evolution network to the first circuit switched domain network or a second circuit switched domain network, where the first circuit switched domain network and the second circuit switched domain network belong to a 2G network or a 3G network, and the third network name is received from a second network device in the 2G network or the 3G network; and the processor 820 is further configured to: in a process of executing a service in the Long Term Evolution network, change from the Long Term Evolution network to the first circuit switched domain network or the second circuit switched domain network, acquire the third network name received by the receiver, and keep a currently displayed network name unchanged or ignore the third network name.

The service is a circuit switched fallback CSFB service, and the processor 820 is specifically configured to: in the process of executing the service in the Long Term Evolution network, change from the Long Term Evolution network to the first circuit switched domain network or the second circuit switched domain network in the following manner: executing the CSFB service, and falling back from the Long Term Evolution network to the first circuit switched domain network or the second circuit switched domain network; or the service is a voice service, and the processor 820 is specifically configured to: in the process of executing the service in the Long Term Evolution network, change from the Long Term Evolution network to the first circuit switched domain network or the second circuit switched domain network in the following manner: when the voice service is executed, performing the handover, by using the network device in the Long Term Evolution network, to the 2G network or the 3G network to execute the voice service.

Figure 9:
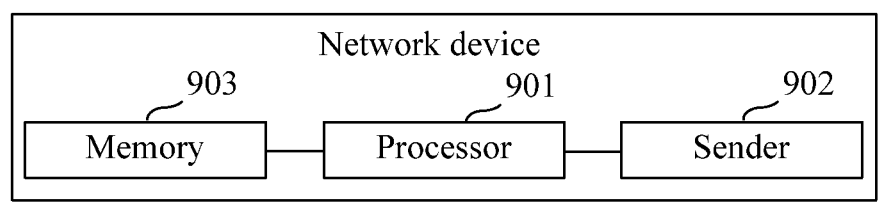
FIG. 9 is a schematic structural diagram of a network device according to another embodiment of the present invention.

Another embodiment of the present invention further provides a network device, where the network device can execute the method for displaying a network name in the foregoing embodiment of the present invention. In this embodiment, only a structure of the network device is simply described. For a specific principle, reference may be made to the description in the foregoing method embodiment. As shown in FIG. 9, the network device includes a sender 910 and a processor 920.

The sender 910 is configured to send a public land mobile network identity PLMN ID of a Long Term Evolution network and a PLMN ID of a circuit switched domain network to a user equipment UE by using a combined attach procedure or a combined tracking area update procedure, where the network device is a network device in the Long Term Evolution network, and the Long Term Evolution network and the circuit switched domain network are two networks with which the UE is registered in a combined manner by using the combined attach procedure or the combined tracking area update procedure;

a memory 930 is configured to store a first configuration, where the first configuration is information of a first network name, the information of the first network name is a predetermined PLMN ID and/or a first network name corresponding to the predetermined PLMN ID, the first network name is a network name displayed on the UE according to a second configuration in the UE, the first configuration is the same as the second configuration, and the predetermined PLMN ID is one of the PLMN ID of the Long Term Evolution network and the PLMN ID of the circuit switched domain network; and the processor 920 is configured to: after the sender sends the PLMN ID of the Long Term Evolution network and the PLMN ID of the circuit switched domain network to the UE, acquire the first configuration stored by the memory 930.

The processor 920 is specifically configured to acquire, in the following manner, the first configuration stored by the memory 930: determining whether a home PLMN ID of the UE is the same as the PLMN ID of the Long Term Evolution network and the PLMN ID of the circuit switched domain network; and if the home PLMN ID is different from both the PLMN ID of the Long Term Evolution network and the PLMN ID of the circuit switched domain network, acquiring the first configuration stored by the memory.

The processor 920 is further configured to determine whether an operator to which the PLMN ID of the Long Term Evolution network belongs is the same as an operator to which the PLMN ID of the circuit switched domain network belongs; and if different, instruct the sender 910 to send information of a second network name; and the sender is further configured to send the information of the second network name to the UE, where the information of the second network name is indicated by the processor 920.

Further, if the network device is a mobility management entity MME, the processor is specifically configured to send the information of the second network name to the UE by using a universal mobile telecommunications system terrestrial radio access network E-UTRAN mobility management information EMM information message.

Figure 10:
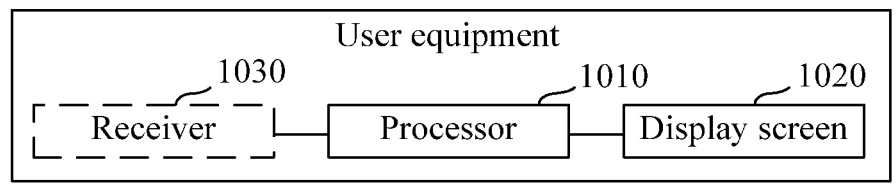
FIG. 10 is a schematic structural diagram of a user equipment according to another embodiment of the present invention.

Another embodiment of the present invention further provides a user equipment, where the user equipment can execute the method for displaying a network name in the foregoing embodiment of the present invention. In this embodiment, only a structure of the user equipment is simply described. For a specific principle, reference may be made to the description in the foregoing method embodiment. As shown in FIG. 10, the user equipment UE includes a processor 1010 and a display screen 1020.

The processor 1010 is configured to:

execute an attach procedure to attach to a first network or execute a combined attach procedure to attach to the first network and a second network, and instruct the display screen to display a first network name; and in a process of executing a service in the first network, change from the first network to the second network or a third network, and instruct the display screen to display the first network name; and the display screen 1020 is configured to display the first network name indicated by the processor 1010.

Because the user equipment in this embodiment can execute the method in the foregoing embodiment, a technical effect that can be achieved by the user equipment is the same as that in the foregoing method embodiment, which is not described in detail herein again.

Further, the processor 1010 is specifically configured to: in the process of executing the service in the first network, change from the first network to the second network or the third network in the following manner: in a process of executing a circuit switched fallback CSFB service in the first network, falling back from the first network to the second network or the third network, where the first network is the Long Term Evolution network, the second network and the third network are circuit switched domain networks, and the service is the CSFB service.

Alternatively, the processor 1010 is specifically configured to: in the process of executing the service in the first network, change from the first network to the second network or the third network in the following manner: in a process of executing a voice service in the first network, performing the handover to the second network or the third network, where the service is the voice service.

Further, the processor 1010 is specifically configured to: in the process of executing the voice service in the first network, be handed over to the second network or the third network in the following manner:

starting the voice service in a Long Term Evolution network, executing single radio voice call continuity or executing a packet-switched handover, performing the handover to the second network or the third network to execute the voice service, where the first network is the Long Term Evolution network, and the second network or the third network is a circuit switched domain network; or starting the voice service in a first 2G network or a first 3G network, executing reverse single radio voice call continuity, performing the handover to a 4G network or a second 3G network or a second 2G network to execute the voice service, and instructing the display screen to display the first network name, where the first network is the first 2G network or the first 3G network, and the second network or the third network is the second 3G network, or the second network or the third network is the second 2G network, or the second network or the third network is the 4G network; or starting the voice service in a first 2G network or a first 3G network, executing a circuit-switched handover, and performing the handover to a second 3G network or a second 2G network to execute the voice service, where the first network is the first 2G network or the first 3G network, and the second network or the third network is the second 3G network, or the second network or the third network is the second 2G network.

In addition, the user equipment may further include a receiver 1030, where the receiver 1030 is configured to receive a second network name of the second network or the third network; and the processor 1010 is specifically configured to receive the second network name transmitted by the receiving module, and ignore the second network name, or instruct the display screen 1020 to display the first network name.

Further, the processor 1010 is further configured to: if the service is executed completely, instruct the display screen to display the second network name, where the second network name is a network name of the second network or the third network; and the display screen is further configured to display the second network name indicated by the processor.

It should be noted that, in addition to the foregoing modules, the user equipment and the network device provided in each of the foregoing embodiments of the present invention may further include a radio frequency processor, a power controller, and another part, and the embodiments of the present invention are all not limited to including only the foregoing modules.

It should be noted that in the foregoing embodiments of the user equipment and the network device, division of each functional module is only an example for description. In an actual application, according to a requirement, for example, according to a configuration requirement of corresponding hardware or consideration of convenience for implementation of software, the foregoing functions are assigned to different functional modules for completion. That is, internal structures of the user equipment and a bastion station are divided into different functional modules, so as to complete all or a part of functions described above. In addition, in an actual application, a corresponding functional module in this embodiment may be implemented by corresponding hardware, or may be completed by corresponding hardware executing corresponding software. For example, the foregoing sending module may be hardware that can execute a function of the foregoing sending module, for example, a transmitter, or may be a general processor or another hardware device that can execute a corresponding computer program so as to complete the foregoing function; for another example, the foregoing processing module may be hardware that can execute a function of the processing module, for example, a processor, or may be another hardware device that can execute a corresponding computer program so as to complete the foregoing function; and for another example, the foregoing receiving module may be hardware that can execute a function of the foregoing receiving module, for example, a receiver, or may be a general processor or another hardware device that can execute a corresponding computer program so as to complete the foregoing function (the foregoing description principles are applicable to each embodiment of the specification).

Figure 11:
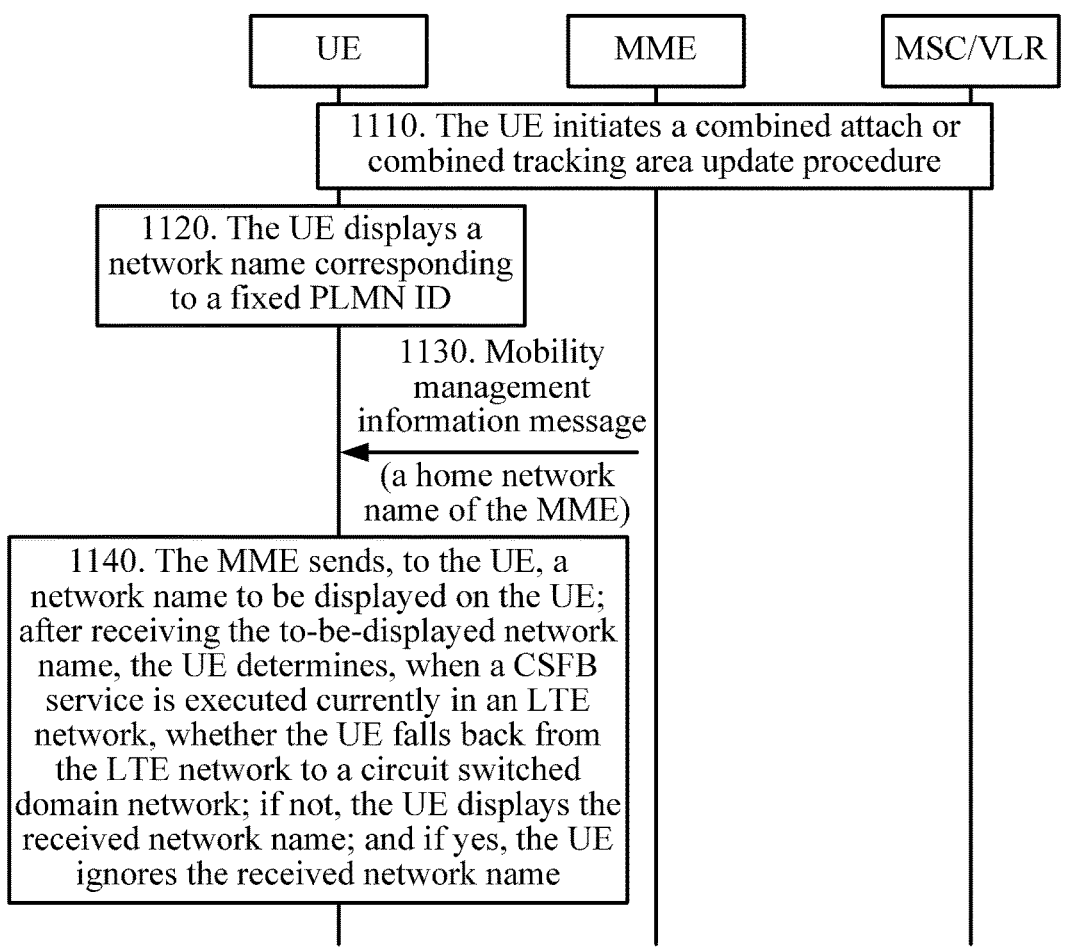
FIG. 11 is a schematic flowchart of an application example according to the present invention.

The following uses an application example to introduce an execution process of the foregoing method and apparatus in the embodiments of the present invention. In this application example, an MME is used as an example of a network device is used as an example for description. However, it should be noted that for different scenarios, different network devices may be used, and this embodiment of the present invention is not limited thereto. As shown in FIG. 11, this application example specifically includes the following steps:

Step 1110: A UE and an MME execute a combined attach procedure, and the UE obtains a PLMN ID of an LTE network and a PLMN ID of a CS domain network.

Step 1120: The UE displays, according to a preset rule, a network name corresponding to a predetermined PLMN ID.

Step 1130: The MME sends, to the UE, a network name to be displayed on the UE; after receiving the to-be-displayed network name, the UE determines, when a CSFB service is executed currently in the LTE network, whether the UE falls back from the LTE network to the circuit switched domain network; if not, the UE displays the received network name; and if yes, the UE ignores the received network name.

It should be noted that this application example is merely an application scenario of the foregoing embodiment; and however, in fact, a part of the steps are optional. For details, reference may be made to the description in the foregoing embodiments.

A person of ordinary skill in the art may understand that all or a part of the steps of the methods in the embodiments may be implemented by a program instructing relevant hardware. The program may be stored in a computer readable storage medium. The storage medium may include: a read-only memory (ROM), a random access memory (RAM), a magnetic disk, or an optical disc.

The method, the user equipment, and the base station provided in the embodiments of the present invention are described in detail above. In this specification, specific examples are used to describe the principle and implementations of the present invention, and the descriptions of the embodiments are provided for ease of understanding of the method and core idea of the present invention. Meanwhile, a person of ordinary skill in the art may make modifications to the specific implementation manners and the application scope according to the idea of the present invention. Therefore, the content of this specification shall not be construed as a limitation to the present invention.

What is claimed is:

1. A method for displaying a network name, comprising:
performing, by a user equipment (UE), one of executing a combined attach procedure to attach to a first network and a second network, and executing a combined tracking area update procedure to attach to the first network and the second network, the first network being an Long Term Evolution (LTE) network and the second network being a circuit switched (CS) domain network;
before receiving a second network name from a first network device in the first network, displaying a first network name corresponding to a predetermined network identity (ID) according to a predefined rule while the UE is registered with the first network and the second network;
displaying the second network name after receiving the second network name from the first network device, wherein the second network name is a network name of one of the first network or the second network;
changing, by the UE and during a process in which the UE executes a service in the first network, from the first network to one of the second network and a third network different than the second network, and
receiving a third network name from a second network device after the UE changes from the first network to one of the second network and the third network, the third network being a CS domain network or an LTE network, and the second network device being in a 2nd generation mobile communications (2G) or 3rd generation mobile communications (3G) network to which the third network belongs; and
maintaining, by the UE and after the UE performs the changing, the display of the second network name without displaying the third network name if the third network name is inconsistent with the second network name, and displaying the third network name if the third network name is consistent with the second network name; and
wherein the third network name is consistent with the second network name when the second network device determines that the UE is handed over in a voice service process or falls back to one of the second network and the third network and the third network name is a network name of a 2G or 3G network in which the UE is located when a voice service is started or the fallback occurs.

2. The method according to claim 1, wherein the fall back is a circuit switched fallback (CSFB) service.

3. The method according to claim 1, wherein the performing the handover to the second network or the third network in a process in which the UE executes the voice service in the first network comprises performing a first handover;
wherein the performing the first handover comprises:
starting, by the UE, the voice service on the first network;
performing at least one of executing single radio voice call continuity or executing a packet-switched handover; and
handing over the UE to the second network or the third network to execute the voice service, wherein at least one of the second network or the third network is a circuit switched domain network.

4. The method according to claim 1, wherein the maintaining the display of the second network name by the UE if the third network name is inconsistent comprises:

receiving, by the UE, information of the third network name; and performing, by the UE, at least one of ignoring the received information of the third network name and maintaining the display of the second network name by the UE, wherein the third network name is a network name of the second network or the third network.

5. The method according to claim 1, wherein the maintaining the display comprises maintaining the display of the second network name for an entire duration of the service;

wherein the method further comprises changing, by the UE and in response to the service being executed completely, display of the second network name to display of the third network name; and wherein the third network name is the network name of the second network or the third network.

6. A user equipment (UE), wherein the UE comprises:

a processor;

a non-transitory computer readable medium connected to the processor and having stored thereon instructions for causing the processor to:

perform one or more of
execute a combined attach procedure to attach the UE to a first network and a second network, and
execute a combined tracking area update procedure to attach the UE to the first network and the second network, the first network being an Long Term Evolution (LTE) network and the second network being a circuit switched (CS) domain network;

instruct a displaying module to display a first network name corresponding to a predetermined network identity (ID) based on a predefined configuration while the UE is registered with the first network and the second network and before receiving a second network name from a first network device in the first network;

instruct the displaying module to display the second network name after receiving the second network name from the first network device, wherein the second network name is a network name of one of the first network or the second network;

change, during a process of executing a service in the first network, from the first network to the second network or a third network different than the second network, and receive a third network name from a second network device after the UE changes from the first network to one of the second network and the third network, the third network being a CS domain network or an LTE network, and the second network device being in a 2nd generation mobile communications (2G) or 3rd generation mobile communications (3G) network to which the third network belongs; and instruct, after the UE changes from the first network to the second network or the third network, the displaying module to maintain the display of the second network name without displaying the third network name if the third network name is inconsistent with the second network name, and to display the third network name if the third network name is consistent with the second network name, wherein the third network name is consistent with the second network name when the second network device determines that the UE is handed over in a voice service process or falls back to one of the second network and the third network and the third network name is a network name of a 2G or 3G network in which the UE is located when a voice service is started or the fallback occurs.

7. The user equipment according to claim 6, wherein the non-transitory computer readable medium further has stored thereon instructions for causing the processor to:

change, in the process of executing the service in the first network, from the first network to the second network or the third network, the changing from the first network to the second network of the third network comprising:

falling back, in a process of executing a circuit switched fallback (CSFB) service in the first network, from the first network to the second network or the third network; and instructing the displaying module to display the second network name wherein the fall back is the CSFB service.

8. The user equipment according to claim 6, wherein the non-transitory computer readable medium further has stored thereon instructions for causing the processor to:

perform, in the process of executing the voice service in the first network, the handover to the second network or the third network, wherein performing the handover to the second network or the third network comprises performing a first handover;

wherein the performing the first handover comprises:

starting the voice service in a Long Term Evolution network, wherein the first network is the Long Term Evolution network;

performing at least one of executing single radio voice call continuity or executing a packet-switched handover;

performing the handover to the second network or the third network to execute the voice service, wherein the second network or the third network is a circuit switched domain network.

9. The user equipment according to claim 6, wherein the non-transitory computer readable medium further has stored thereon instructions for causing the processor to:

receive the third network name of the second network or the third network; and instruct the displaying module to display the second network name, the instructing the displaying module to maintain the display of the second network name if the third network name is inconsistent comprising:

acquiring the received third network name; and performing at least one of ignoring the third network name or instructing the displaying module to display the second network name.

10. The user equipment according to claim 6, wherein the instructions causing the processor to instruct the displaying module to maintain the display comprise instructions causing the processor to instruct the displaying module to maintain the display of the second network name for an entire duration of the service, and wherein the non-transitory computer readable medium further has stored thereon instructions for causing the processor to:

instruct, in response to the service executing completely, the displaying module to display the third network name, wherein the third network name is a network name of the second network or the third network.

11. A user equipment, wherein the user equipment comprises:

a display screen configured to display a network name; and a processor connected to the display screen, wherein the processor is configured to:
perform at least one of
execute a combined attach procedure to attach to a first network and a second network, and
execute a combined tracking area update procedure to attach to the first network and the second network, the first network being an Long Term Evolution (LTE) network and the second network being a circuit switched (CS) domain network;
instruct the display screen to display a first network name corresponding to a predetermined network identity (ID) based on a predefined configuration while the user equipment is registered with the first network and the second network and before receiving a second network name from a first network device in the first network;
instruct the displaying screen to display the second network name after receiving the second network name from the first network device, wherein the second network name is a network name of one of the first network or the second network;
change, during a process of executing a service in the first network, from the first network to the second network or a third network different than the second network, and receive a third network name from a second network device after the UE changes from the first network to one of the second network and the third network, the third network being a CS domain network or an LTE network, and the second network device being in a 2nd generation mobile communications (2G) or 3rd generation mobile communications (3G) network to which the third network belongs; and
instruct, after the user equipment changes from the first network to the second network or the third network, the display screen to maintain the display of the second network name without displaying the third network name if the third network name is inconsistent with the second network name, and to display the third network name if the third network name is consistent with the second network name, wherein the third network name is consistent with the second network name when the second network device determines that the user equipment is handed over in a voice service process or falls back to one of the second network and the third network and the third network name is a network name of a 2G or 3G network in which the user equipment is located when a voice service is started or a fallback occurs.

12. The user equipment according to claim 11, wherein the falling back is, a circuit switched fallback (CSFB) service.

13. The user equipment according to claim 11, wherein the performing, in a process of executing a voice service in the first network, the handover to the second network or the third network comprises:
starting the voice service in the Long Term Evolution network;
performing at least one of executing single radio voice call continuity or executing a packet-switched handover; and
performing the handover to the second network or the third network to execute the voice service, wherein the first network is the Long Term Evolution network.

14. The user equipment according to claim 11, further comprising a receiver;
wherein the receiver is configured to receive the third network name of the second network or the third network; and
wherein the instructing the display screen to maintain the display of the second network name if the third network name is inconsistent comprises:
acquiring the third network name received by the receiver; and
performing one or more of ignoring the third network name or instructing the display screen to display the second network name.

15. The user equipment according to claim 11,
wherein the processor being configured to instruct the display to maintain the display comprises the processor being configured to instruct the display screen to maintain the display of the second network name for an entire duration of the service;
wherein the processor is further configured to instruct, in response to the service executing completely, the display screen to display the third network name;
wherein the third network name is a network name of the second network or the third network; and
wherein the display screen is further configured to display the third network name indicated by the processor.

* * * * *